June 18, 1968 H. H. HOLLY 3,388,529

SEPARATOR FEEDER

Original Filed Dec. 31, 1964 11 Sheets-Sheet 1

INVENTOR.
Harry H. Holly
Hofgren, Wegner, Allen,
Stellman + McCord ATTORNEYS.

June 18, 1968 H. H. HOLLY 3,388,529

SEPARATOR FEEDER

Original Filed Dec. 31, 1964 11 Sheets-Sheet 2

SEPARATOR FEEDER

June 18, 1968 H. H. HOLLY 3,388,529

SEPARATOR FEEDER

Original Filed Dec. 31, 1964 11 Sheets-Sheet 6

United States Patent Office 3,388,529
Patented June 18, 1968

3,388,529
SEPARATOR FEEDER

Harry H. Holly, Olympia Fields, Ill., assignor to Hollymatic Corporation, a corporation of Illinois
Original application Dec. 31, 1964, Ser. No. 422,672, now Patent No. 3,293,688, dated Dec. 27, 1966. Divided and this application Apr. 20, 1966, Ser. No. 553,597
7 Claims. (Cl. 53—389)

ABSTRACT OF THE DISCLOSURE

An article shaping device such as a machine for molding patties of food material and having an apparatus for applying a flexible sheet such as a sheet of separator paper to the successive patties, the apparatus including means for propelling the article after it is shaped in a path through space and through the opening in a frame so as to pick up the sheet that has been previously placed in the frame. In a preferred construction the sheet is held in the frame in bowed condition. In another preferred construction a movable carrier is provided for carrying a sheet from a stack retaining means to the frame that is spaced from the stack retaining means.

This application is a division of my copending application Ser. No. 422,672, filed Dec. 31, 1964, and now Patent No. 3,293,688.

This invention relates to a molding apparatus for plastic material such as for molding patties out of ground meat, fish and other food products.

Molding apparatus of this type that have been proposed in the past have employed movable molds having mold openings therein. One such apparatus is disclosed and claimed in my prior Patent 3,061,872. Other molding apparatus are disclosed in my other prior patents of which Patent 2,787,808 is an example.

One of the features of the invention is to provide in an article shaping device in which an article such as a food patty is shaped for applying a flexible sheet having a plurality of peripheral edges to the shaped article comprising means for propelling the article in a path through space, means including a frame defining an opening in the path through which the article passes in the propelling, the frame having retaining means for engaging all the edges to retain the sheet in the frame to span the opening, some of the retaining means being located opposite each other and spaced a shorter distance apart than the corresponding dimension of the flexible sheet to retain the sheet in bowed condition, and means for moving a sheet into the frame.

Another feature of the invention is to provide in an article shaping device in which an article is shaped apparatus for applying a flexible sheet having a plurality of peripheral edges to the shaped article comprising means for propelling the article in a path, means including a frame defining an opening in the path through which the article passes, the frame having retaining means for engaging the edges to retain the sheet in the frame to span the opening, stack means for holding a stack of the sheets exteriorly of the frame and having an open bottom, a movable carrier having sheet engaging means thereon, means for mounting the carrier for movement between a first position beneath the stack means bottom and a second position adjacent the frame opening and back again, means for mounting the carrier for movement upwardly from the first position to engage a bottom sheet on the stack with the sheet engaging means preparatory to movement of the carrier and the sheet to the second position, and for movement downwardly at the second position to leave the sheet in the frame retaining means, and means for moving the carrier upwardly at the first position to thusly engage the bottom sheet, then to the second position for engaging the side edges in the frame retaining means, then downwardly to leave the sheet in the frame, and next back to the first position.

Other feature and advantages of the invention will be apparent from the following description of one embodiment thereof taken in conjunction with the accompanying drawings.

Figure 1:
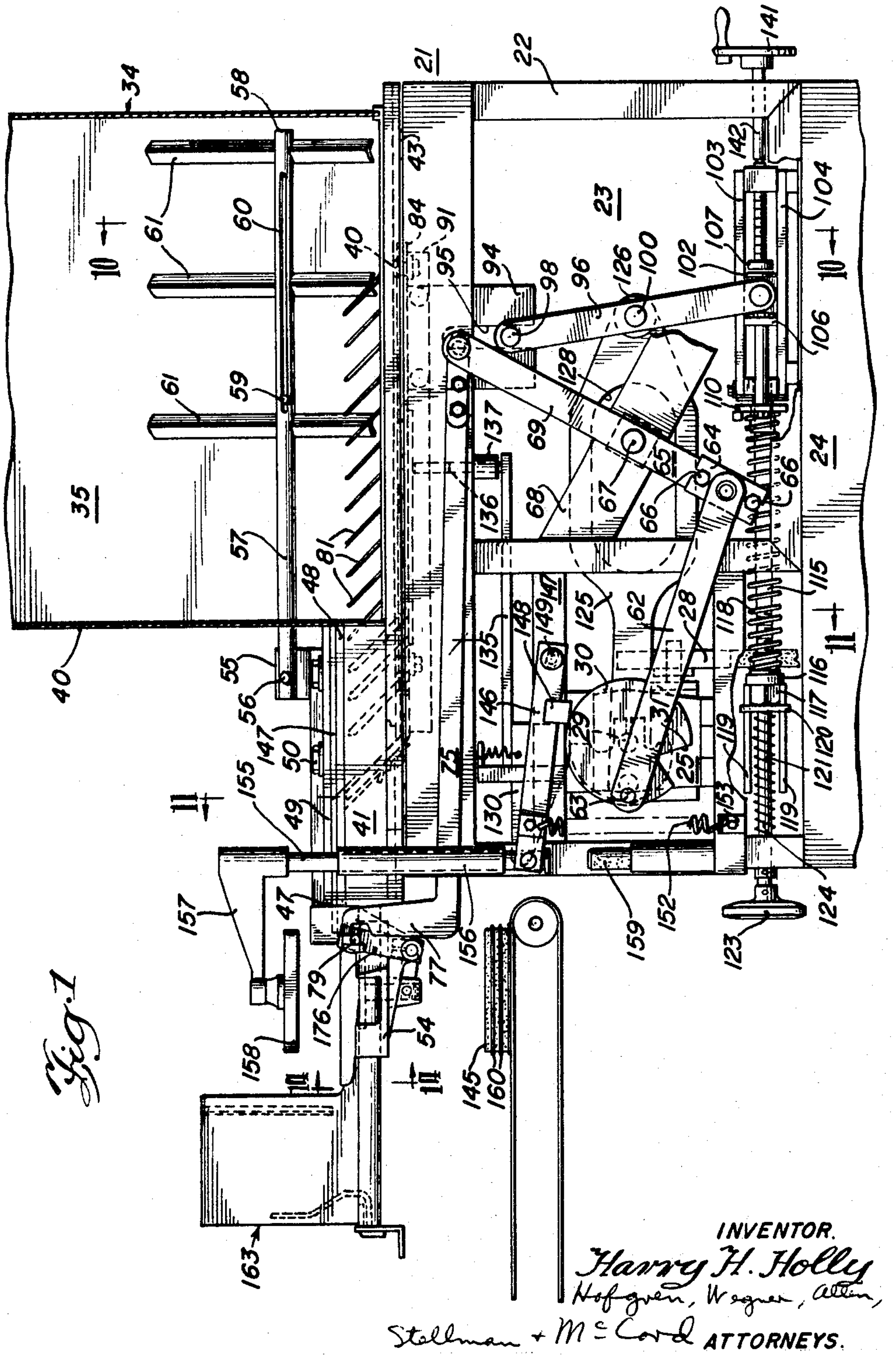
FIGURE 1s is a side elevational view of an apparatus embodying the invention with a side closure plate on the machine compartment being omitted for clarity of illustration and with an embodiment of the hopper being shown in longitudinal vertical section and with the parts being shown in one extreme position.

The molding apparatus 21 of this invention includes a top framework 22 enclosing the top 23 of the machine compartment. Beneath this machine compartment top 23 is a bottom compartment 24 in which are located a conventional electric motor and other power parts of the apparatus.

Mounted within the machine compartment top 23 at one end thereof, which in the illustrated embodiment is the front end, is a gear reducer 25 that includes a drive shaft 26 extending from the rear end thereof and carrying a pulley 27. This is driven by a belt 28 which is driven by the above-mentioned motor located in the bottom machine compartment 24.

Extending from the right side of the gear reducer 25 is a shaft 29 on which is mounted a generally circular knockout cam 30 having on the periphery thereof a notch 31. (Right and left identify the sides of the machine as viewed from the front of the machine.) The function of this cam will be explained later.

Extending from the left side of the gear reducer 25 is the other end 32 of shaft 29. Mounted on this shaft end 32 is a second cam 33, shown in detail side elevational FIGURES 5 and 9. The cams 30 and 33 mounted on opposite sides of the reducer 25 are used to operate various parts of the apparatus which will be described in detail hereinafter.

Figure 2:
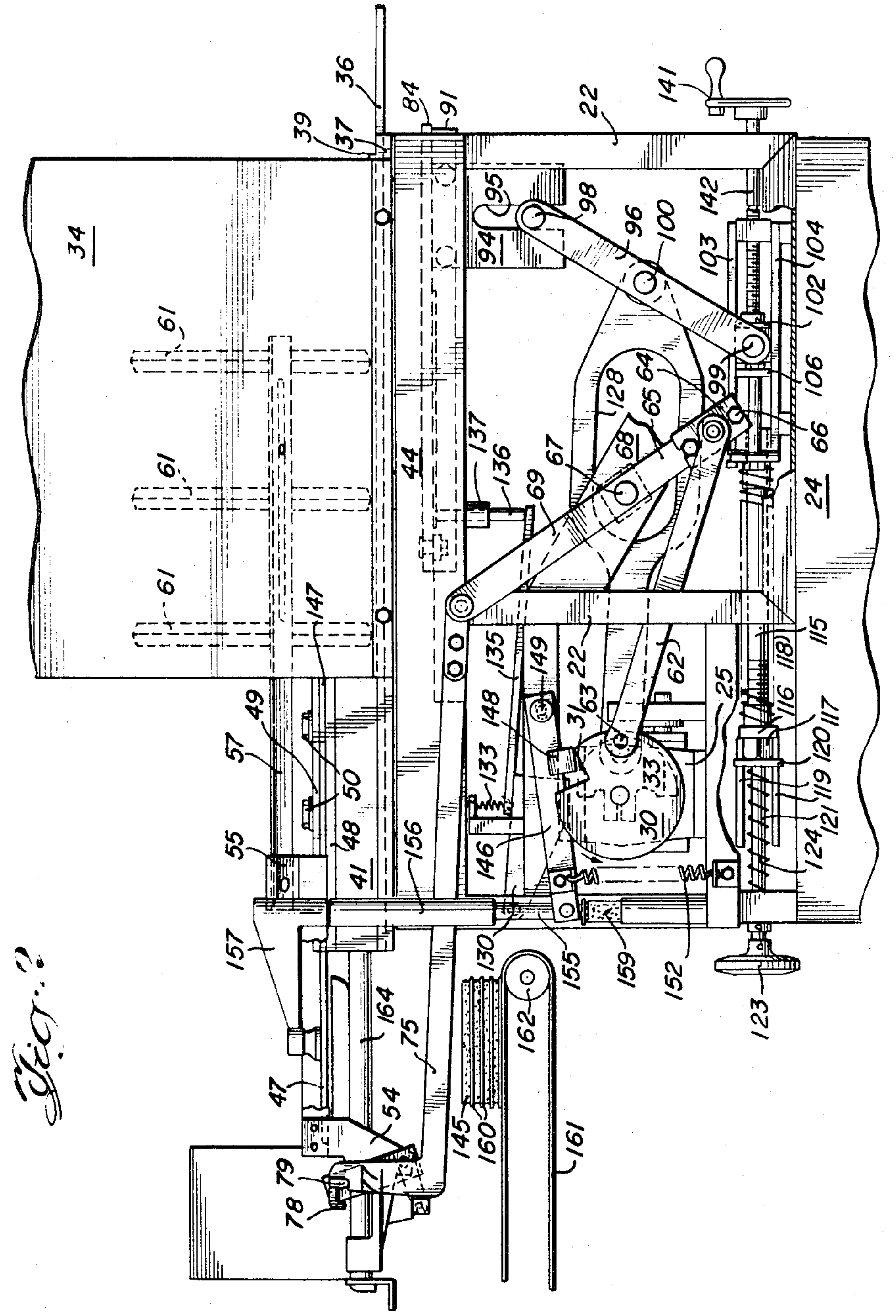
FIGURE 2 is a view similar to FIGURE 1 except that the hopper is shown in side elevation and that the parts are shown in the opposite extreme position.
Figure 8:
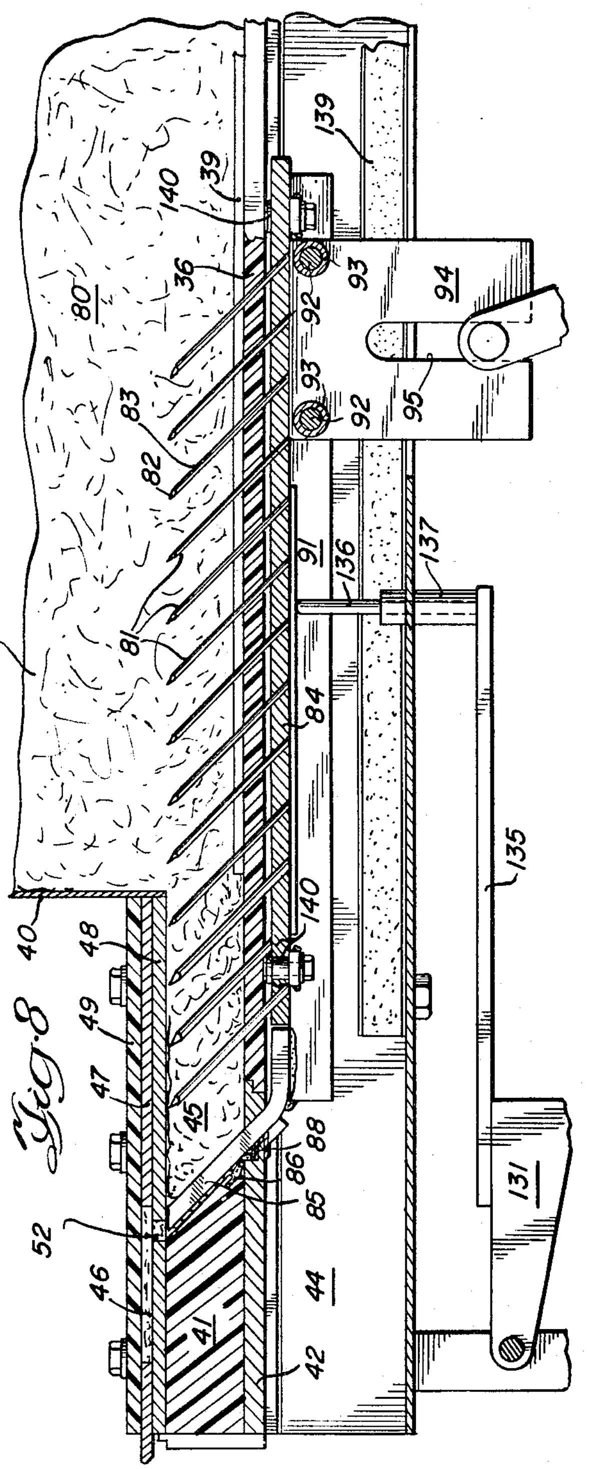
FIGURE 8 is a fragmentary vertical sectional view taken along the line 8—8 of FIGURE 4.
Figure 9:
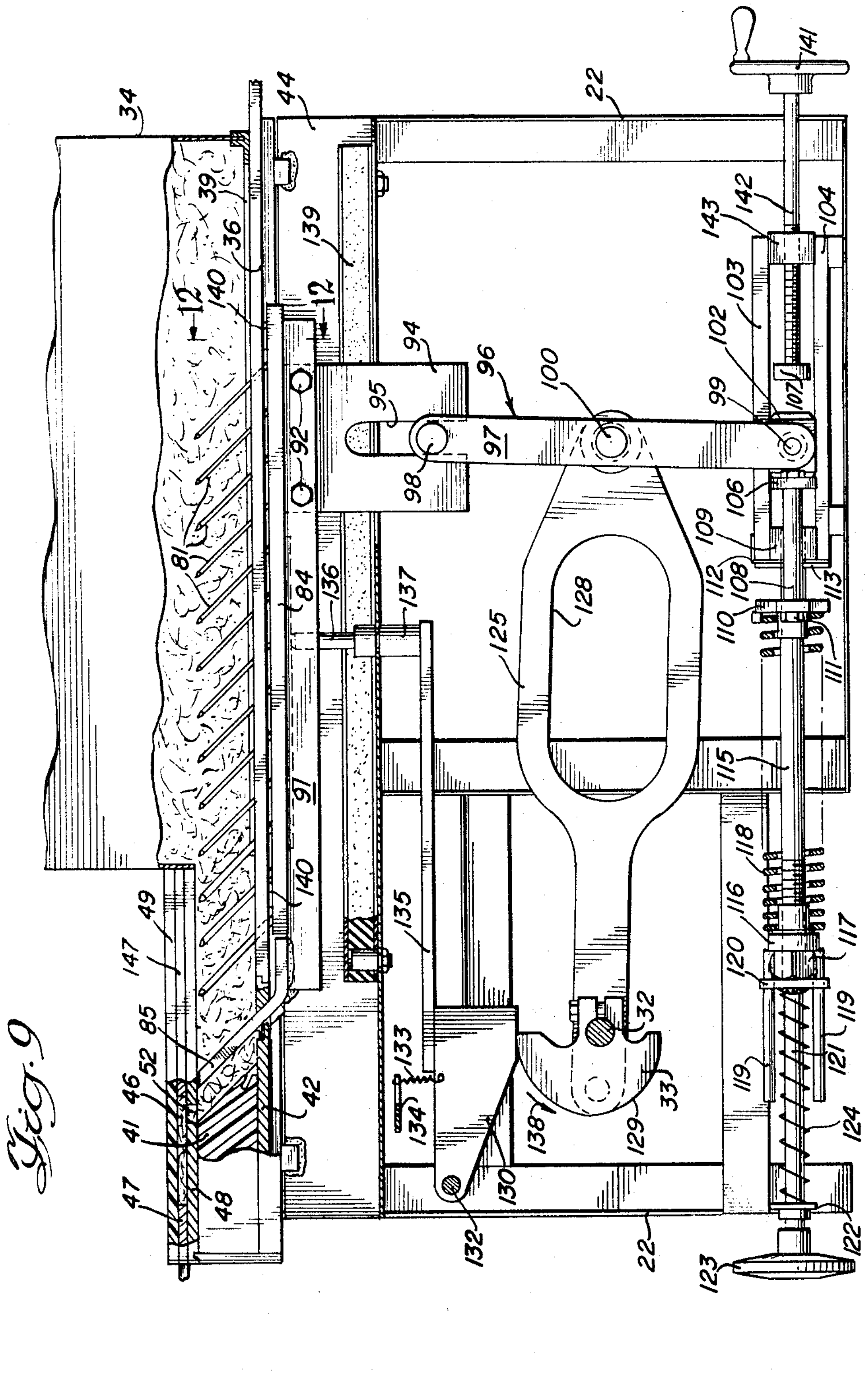
FIGURE 9 is an enlarged view similar to FIGURE 5 but showing the bottom of the hopper and the feed passage therefrom in vertical section and also showing in side elevation the feeder elements themselves.
Figure 10:
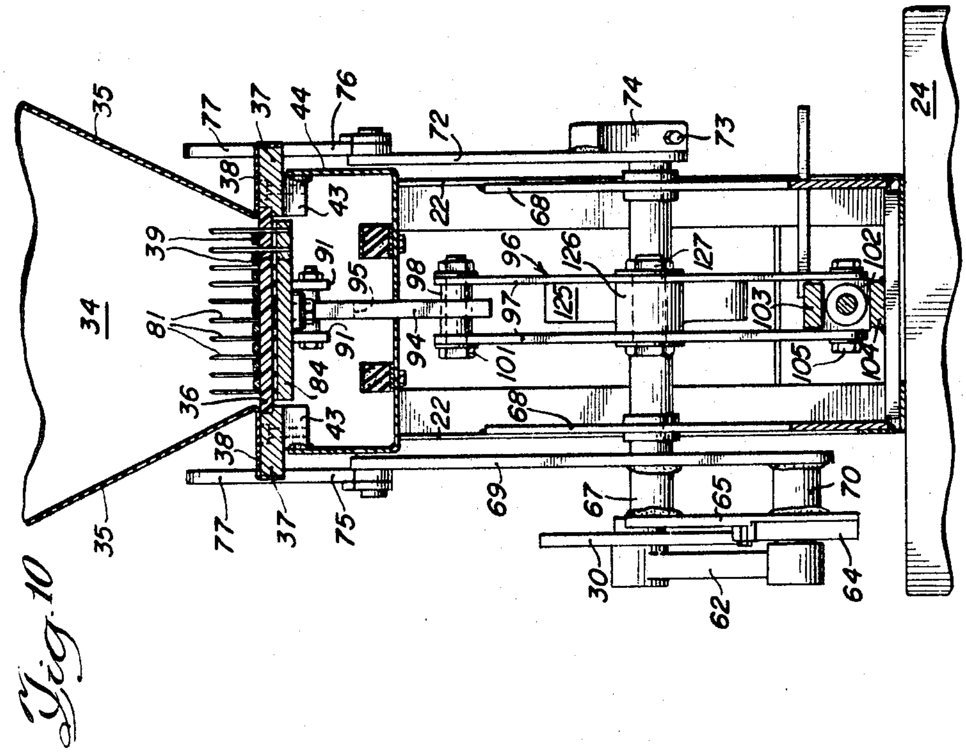
FIGURE 10 is a vertical sectional view at the rear of the apparatus and taken along line 10—10 of FIGURE 1 showing some of the parts in section and omitting other parts for clarity of illustration.

Mounted on the top of the frame 22 adjacent the rear or right-hand side thereof, as shown in FIGURES 1 and 2, is a hopper 34 having outwardly flaring sides 35, as shown in FIGURE 10. Immediately beneath the hopper 34, as shown most clearly in FIGURES 8 and 9, is a horizontal bottom plate 36, here shown as made of a transparent rigid plastic. The plate 36 is retained between parallel side members 37 forming the top of the apparatus on either side of the hopper 34. The hopper sides 35, as shown in FIGURE 10, extend outwardly over the tops and sides of the side members 37, as indicated at 38 in FIGURE 10.

Mounted on the top surface of the plate 36 within the hopper 34 are parallel coplanar strips 39 which together with the plate 36 form the bottom of the hopper.

Extending forwardly of the front wall 40 of the hopper 34 is an elongated block 41 which may be of metal or a plastic, preferably transparent. This block 41 is of rectangular cross section and is mounted on the forward ends of the side members 37. The bottom of this block 41 is supported on a metal plate 42 that is substantially coplanar with the bottom plate 36 beneath the hopper 34. The assembly of bottom plates 36 and 42, parallel strips 39 and side members 37 is supported by parallel bottom side blocks 43 that are mounted at the top of an enclosing channel shaped casing 44. This casing 44 is supported on the top of the framework 22.

The elongated block 41 is shaped at the end adjacent the front wall 40 of the hopper 34 to provide a forwardly extending passage means 45 of rectangular vertical cross section to provide access between the bottom of the hopper 34 and the mold opening 46 in a reciprocable mold plate 47.

Figure 4:
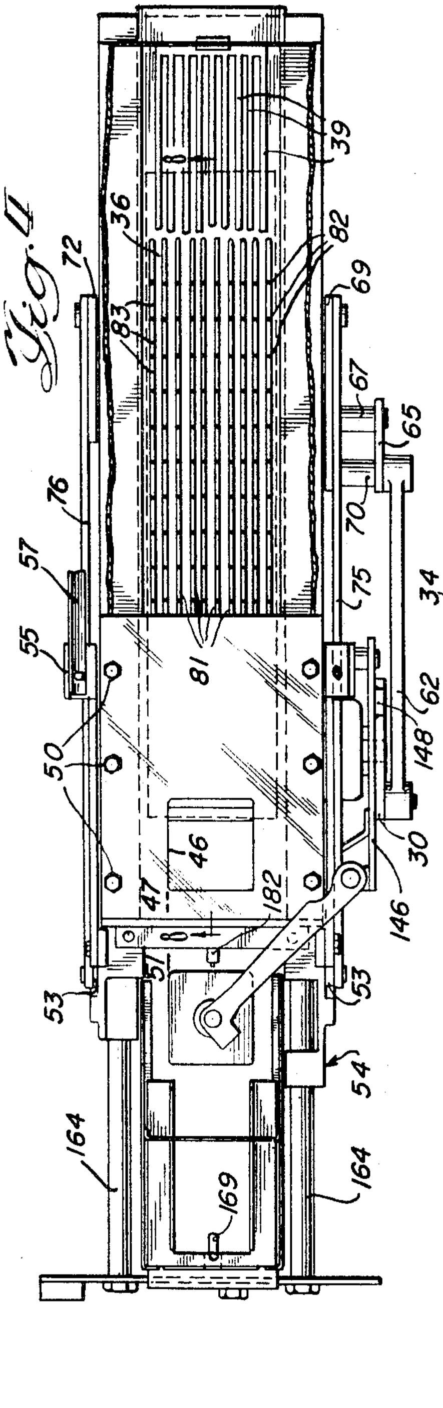
FIGURE 4 is a plan view or the apparatus of FIGURE 1 with the sides of the hopper being broken away.

The mold plate 47 is held between a bottom plate 48 on the top of the block 41 and a top plate 49, here of clear plastic, as shown in FIGURE 4. The assembly of block 41, bottom plate 48 and top plate 49 is held by spaced bolts 50 arranged in two sets of three each on opposite sides of the assembly and extending through the assembly and into the side members 37. This makes a very rigid assembly fastened to the side members 37 and by way of the side blocks 43 to the framework of which the casing 44 forms a part. Although the assembly is rigid, the mold plate 47 is free to reciprocate toward and away from the hopper 34 between side spacers 147 that provide a fixed space for the mold plate 47, in the manner to be described in greater detail hereinafter.

As is shown most clearly in FIGURE 4, the front end 51 of the mold plate 47 extends beyond the enclosing plates 48 and 49 even when the mold plate 47 is in its retracted position as shown in FIGURES 1 and 4.

In order to provide access from the forward end of the passage means 45 to the mold opening 46 the plate 48 beneath the mold plate 47 is provided with a transverse slot 52.

The mold plate 47 which is shown in retracted or rearward position in FIGURE 1 and in extended position in FIGURE 2 is provided at its forward end 51 with side brackets 53 on either side thereof. These side brackets 53 which are attaached to the mold plate 47 are also attached to the reciprocable carriage 54 of a paper feed structure to be described in greater detail hereinafter.

Figure 14:
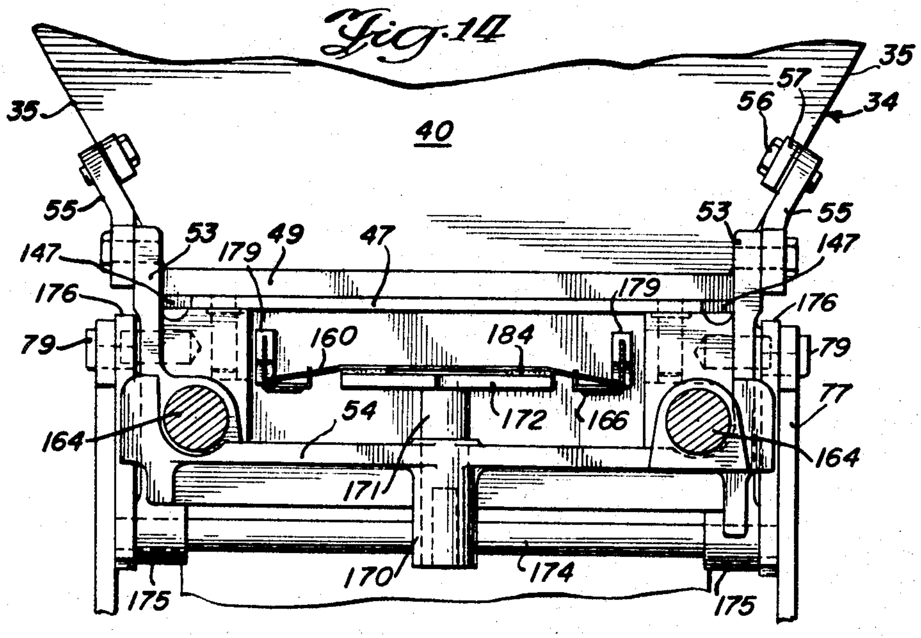
FIGURE 14 is an enlarged fragmentary vertical sectional view substantially along line 14—14 of FIGURE 1.

At opposite sides of the mold plate and adjacent the front wall 40 of the hopper 34 are a pair of outwardly flaring ears 55 movable with the mold plate. These ears are substantially aligned with the flaring side walls 35 of the hopper 34, as shown in FIGURE 14. Extending rearwardly from each of these ears 55 and attached thereto by a bolt 56 is a horizontal bar 57. Each bar extends through an opening in the front wall 40 of the hopper adjacent a side wall 35. When the mold plate 47 is retracted, as shown in FIGURE 1, each bar has its rear end 58 adjacent the rear of the hopper 34. Thus, when the mold plate 47 is reciprocated in its path, each horizontaal bar 57 is also reciprocated. This movement of each bar is confined to a fixed horizontal path by means of a pin 59 extending inwardly of a hopper side wall 35 and engaging an elongated slot 60 in its bar 57. Each bar 57 carries a plurality, here shown as three, of spaced scrapers 61 of angular cross section. These scrapers are particularly important where an adhesive plastic material such as ground meat is retained in the hopper 34, as they serve to scrape the adhesive plastic material from the sides of the hopper with each reciprocation of the mold plate 47. As is shown by a comparison of FIGURES 1 and 2, these scraper bars 61 cover substantially the entire lower portion of the side walls 35 during the reciprocation of the mold plate 47.

As mentioned earlier, the cam 30 on the forward side of the apparatus is rotated by the gear reducer shaft 29. Mounted on this cam 30 adjacent the periphery thereof is one end of a drive rod 62 with this end rotatably mounted on the cam 30 by a pin 63. This drive rod 62 is a part of the mold plate reciprocating mechanism and extends downwardly and rearwardly toward the rear or the right-hand side of the apparatus as shown in FIGURES 1 and 2. The rear end of this drive rod 62 is rotatably attached to a block 64 which is slidable on the lower end of a short rod 65 that extends upwardly from rod 62. The block 64 is slidable on the rod 65 merely for adjusting the position of the block and thus of the hinged lower end of the drive rod 62 on the rod 65. The block 64 is retained in its adjusted position by a pair of end screws 66.

The upper end of the short rod 65 is attached to a horizontal shaft 67 that extends through a pair of oppositely located side frame members 68 that are arranged on a diagonal for strengthening purposes.

Arranged substantially parallel to the short rod 65 is a longer rod 69 that also extends upwardly. The two rods 65 and 69 are attached together at their lower ends by means of a tie bar 70. The rods 65 and 69 are tied together at the upper end of the shorter rod 65 by means of the rotatably mounted shaft 67.

Figures 3, 12, 13:
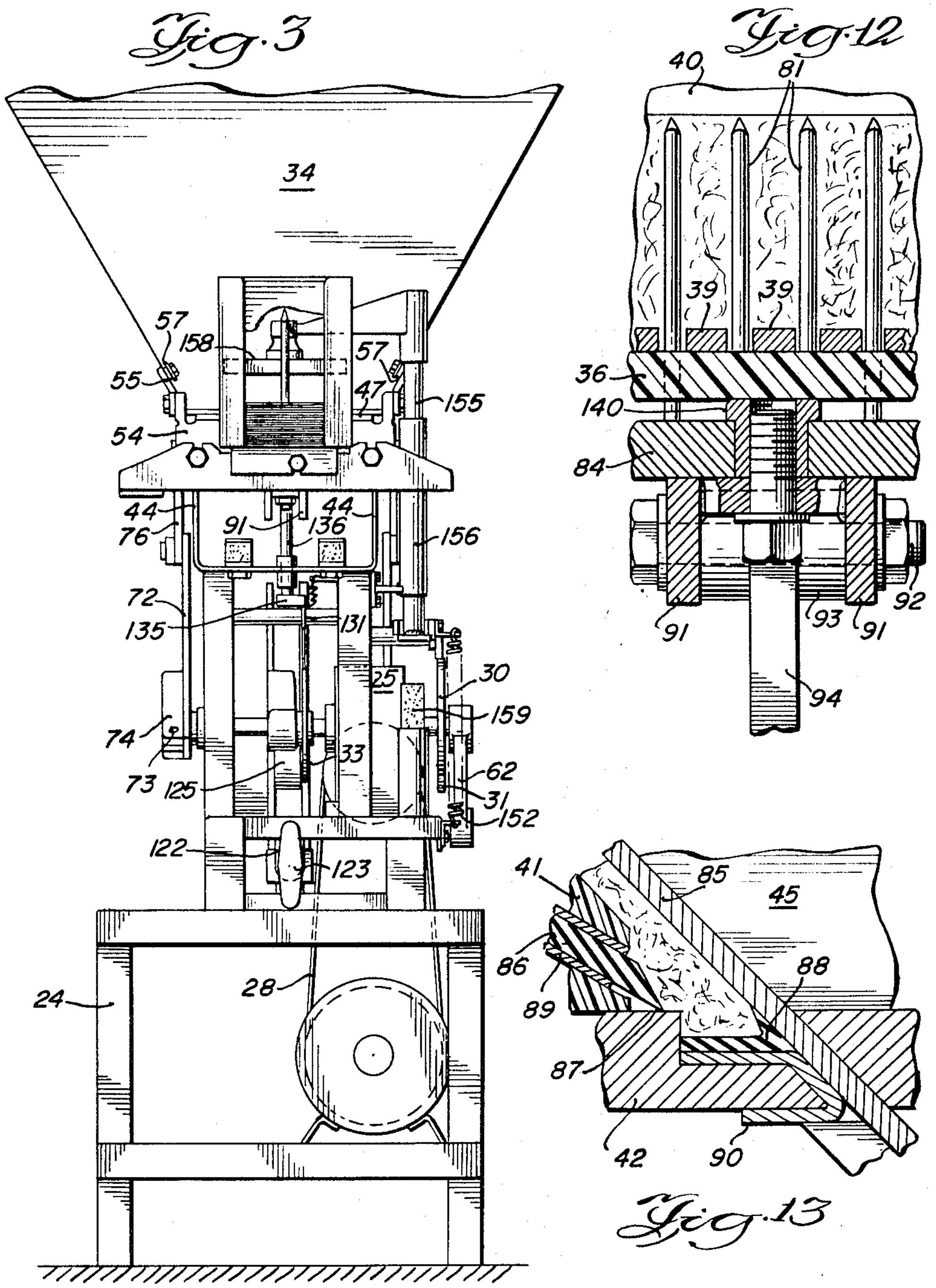
FIGURE 3 is an end elevational view taken from the left end of FIGURE 1.
FIGURE 12 is an enlarged detailed sectional view taken substantially along line 12—12 of FIGURE 9.
FIGURE 13 is a fragmentary detail sectional view of a portion of FIGURE 8.

The upper end of the long rod 69 is adjacent the side of the casing 44. Mounted on the left end of the shaft 67 adjacent the left side of the apparatus is a rod 72 that is substantially parallel to the rod 69. The rods 65, 69 and 72 are in the form of flat elongated metal strips and the upper ends of the rods 69 and 72 are substantially horizontally aligned on opposite sides of the casing 44. The left rod 72 is attached to the left end of the shaft 67 by means of a set screw 73 in an attaching block 74 that is attached to the lower end of the rod 72 (FIGURES 3 and 10).

Rotatably mounted on the upper end of the one parallel rod 69 is the rear end of a forwardly extending drive bar 75. Similarly attached to the upper end of the rear drive rod 72 is a second drive bar 76 exactly similar to the bar 75. Each of the bars 75 and 76 is provided with a vertically extending leg 77 formed on its upper end as a forwardly extending hook 78. Each hook 78 engages a pin 79 on the paper carriage 54 to which the forward end of the mold plate 47 is attached in the manner previously described.

With this arrangement, as the cam 30 is rotated by means of its shaft 29 the drive rod 62 is moved back and forth which reciprocates rods 65, 69 and 72 with the horizontal shaft 67. In turn, this reciprocation of the rods 69 and 72 reciprocates the drive bars 75 and 76 and thus the mold plate 47. The reciprocation of the mold plate 47 is in a fixed path of fixed extent, one end of which is in communication with the passage means 45 and slot 52, as shown in FIGURES 4 and 8, to receive plastic material from the hopper 34. The other end of this reciprocation path of the mold plate 47 is exteriorly of the apparatus and forwardly of the supporting block 41 and plates 48 and 49.

As described earlier, the bottom of the hopper 34 is defined by the bottom plate 36 with the forward plate 42 being an extension thereof as shown in FIGURE 9. The bottom plate structure 36 and 42 is reciprocable horizontally as is shown by a comparison with FIGURE 6 where the plates are in their forwardmost position and FIGURE 7 where the plates are in their rearwardmost position. Also, as previously described, the parallel closely spaced strips 39 which are at the bottom of the hopper 34 on top of the reciprocable plate 36 are fixed and cooperate with the plate structure 36 and 42 to support the ground meat 80 or similar plastic material in the hopper.

In order to feed the meat 80 or similar material forwardly from the bottom of the hopper through the passage means 45 and into the mold opening 46 there are provided reciprocable urging means here shown as laterally spaced rows of longitudinally spaced pins 81 each inclined upwardly and forwardly. Each pin includes a top point 82 at the end of the pin shank 83. As is shown in FIGURE 4, the pins 81 are arranged in parallel rows with each row being located between adjacent parallel strips 39.

Figures 5, 6, 7:
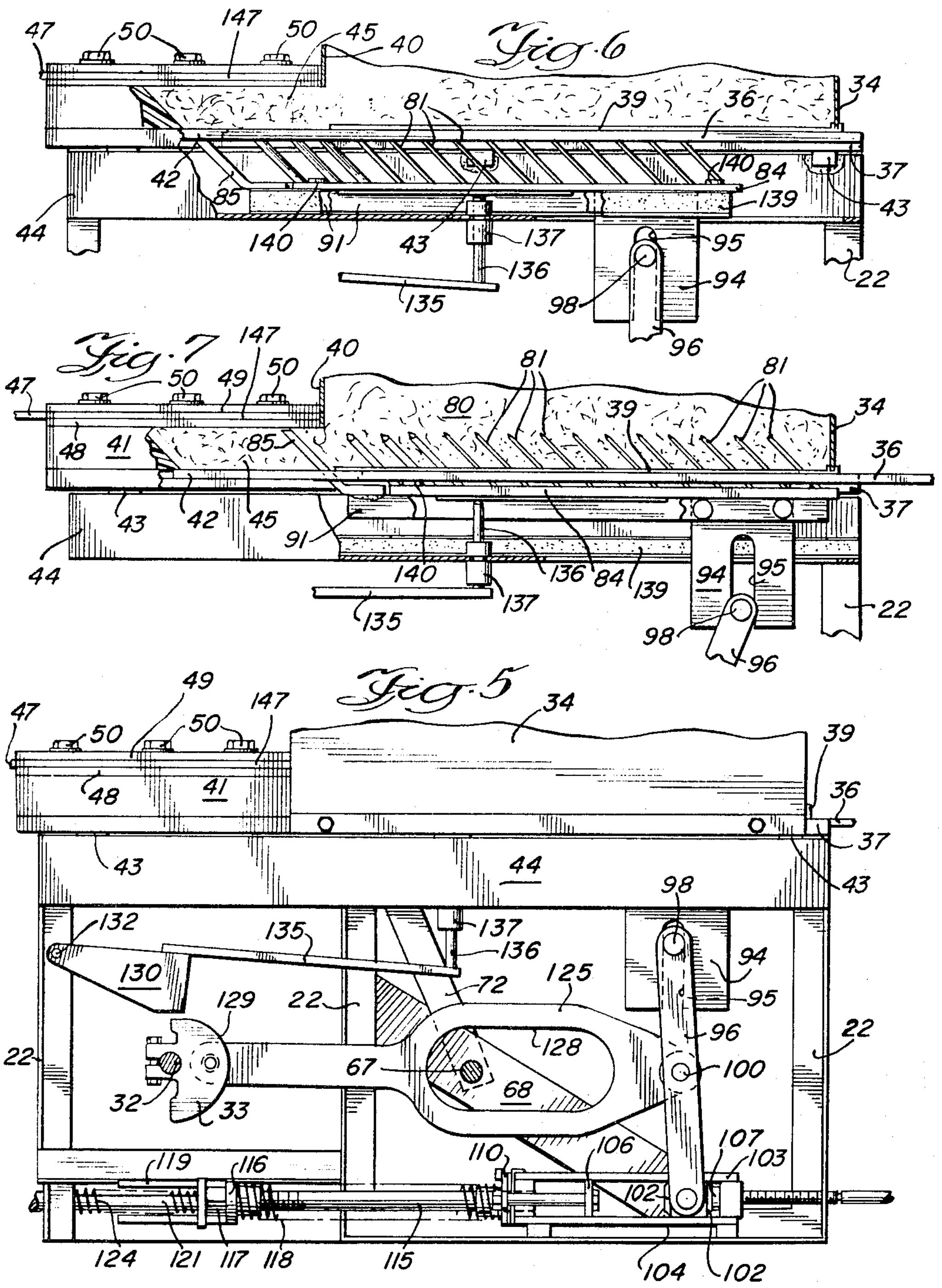
FIGURE 5 is a detailed side elevational view illustrating the drive apparatus for the feeder elements of the apparatus.
FIGURE 6 is a detailed vertical sectional view illustrating additional parts of the feeding apparatus and with these parts being in forward retracted positions.
FIGURE 7 is a view similar to FIGURE 6 but showing the parts in forward extended positions.

The bottom end of each pin is attached to a pin plate 84. The pins extend upwardly and forwardly from this plate 84, as shown in FIGURE 8, and through the reciprocable bottom plate 36. The pin plate 84 is reciprocated back and forth in a longitudinal direction with respect to the apparatus and simultaneously is raised and lowered so that the plate 84 and attached pins describe a generally rectangular four motion path. This path is in a cycle of four successive movements with one being downwardly from the position shown in FIGURE 8 to the position shown in FIGURE 6, the next being rearwardly away from the mold opening 46 with the pins still retracted, the next upwardly as shown in FIGURE 7 to project the pins 81 into the ground meat 80 and the next forwardly to the beginning position shown in FIGURE 8. Each four motion cycle causes the urging means embodied in the pins 81 and associated structure to urge the meat or other plastic material into the passage 45.

Figure 11:
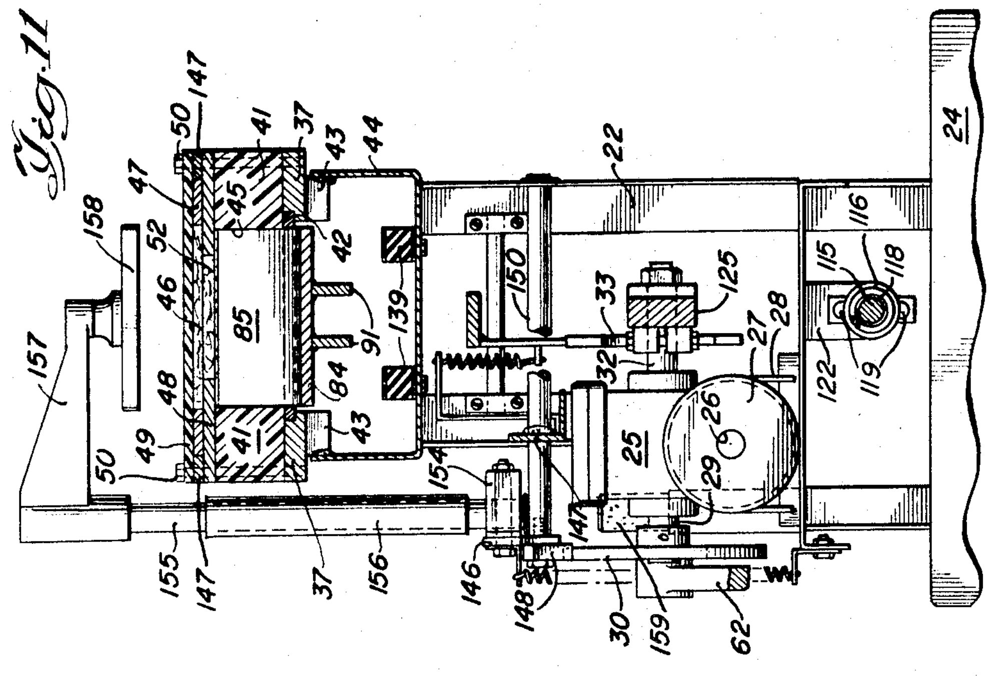
FIGURE 11 is a vertical sectional view taken along line 11—11 of FIGURE 1 and again showing some of the parts in section and omitting others for clarity of illustration.

Also associated with the plate 84 carrying the pins 81 and at the forward end thereof is a feeder means including the upwardly and forwardly inclined feeder bar 85. This feeder bar 85, as is shown in FIGURE 11, extends substantially completely across the access passage means 45 and substantially from top to bottom thereof when the pin plate 84 is in its raised position as shown in FIGURE 8 for example. Thus, when the plate 84 is moved in the forward movement of the four motion cycle from the position shown in FIGURE 7 to the position shown in FIGURE 8 meat or other plastic material in the passage 45 is forced through the slot 52 in the bottom plate 48 into the mold opening 46 which at that time is in communication with the slot.

As is shown most clearly in FIGURE 13, sealing means are provided between the movable plate 42 and the bottom of the support block 41. This sealing means is in the form of a strip of flexible neoprene 86 having a tapered edge 87 bearing against the top of the reciprocable plate 42. Furthermore, as the feeder bar 85 moves relative to the plate 42 sealing means also in the form of a neoprene strip 88 is held in the plate 42 against the forward surface of the bar 85. The neoprene 86 is removably held in a holder 89 while the neoprene 88 is removably held by a clip 90. In order to reciprocate the plate 84 in a backward and forward direction, there is mounted on the bottom of this plate a pair of spaced depending flanges 91. Extending between these flanges are a pair of parallel bolts 92. Each bolt extends through a metal spacer 93 extending between the flanges 91 and with the spacers carrying a depending metal bar 94 that is generally flat and arranged parallel to the flanges 91. This bar 94 extends downwardly a considerable distance, as shown for example in FIGURE 9, and is provided with a vertical slot 95. The bar 94 with its slot 95 is utilized in reciprocating the pin plate 84 backwards and forwards and slot 95 permits lifting and lowering the plate 84 vertically so that a combination of these motions comprises the four motion cycle previously described.

In order to cause the back and forth reciprocation of the plate 84 and its attached flanges 91 and depending bar 84, there is provided an upwardly extending lever 96 in the form of two spaced parallel strips 97. This lever 96 is operatively attached at a first point defined by the transverse bar 98 to the feeder means embodied in the pin plate 84 and depending bar 94 and is fulcrumed at a second point 99 (FIGURES 2 and 9) which is the lower end of the lever 96 and force is applied to the lever 96 at a third point 100 which is at substantially the center of the lever 96.

As indicated, the first point 98 is defined by a transverse generally cylindrical bar 98 positioned in the slot 95 of the plate 94 and extending between the metal strips 97 of the lever 96 (FIGURE 10). The metal strips and the bar 98 are held in assembly by a bolt 101. The second point 99 of the lever which is at the bottom of the lever is defined by a metal slide block 102 that extends between the lever ends of the metal strips 97 and that is guided for horizontal sliding movement between upper and lower bearing strips 104 and 104. The slide block 102 is held in position by a bolt 105 similar to the upper bolt 101.

The slide block 102 is movable between a pair of stop members 106 and 107 (FIGURES 5 and 9). The first stop member 106 which is on the forward side of the block 102 functions as a first fulcrum during movement of the feeder means embodied in the pin plate 84 and pins 81 and the feeder bar 85 in its movement toward the mold opening 46. The second stop member 107 on the opposite side of the slide block 102 functions as a second fulcrum on moving the feeder means away from the mold opening.

The first stop member 106 is mounted on a pair of parallel shafts 108 straddling spacer block 109. The forward ends of the pair of shafts 108 are connected by a cross plate 110. Each shaft 108 is in the form of a metal cylinder extending between the member 106 and the plate 110 with each cylinder having a bolt 111 therethrough.

The forward ends of the bearing strips 103 and 104 carry a metal strip 112 faced with a rubber bumper strip 113 so as to absorb shock. Extending forwardly of the spacer block 109 is a rod 115 which at its rear end extends through the plate 110 and is fixedly mounted to spacer block 109. The forward end of the rod 115 is provided with a bearing collar 116 which is attached to the rear side of a nut 117. Surrounding the rod 115 between the plate 110 and the collar 116 is a compression spring 118.

The nut 17 has attached thereto a pair of forwardly extending spaced fingers 119. These fingers extend through and are movable relative to a plate 120 that is fastened on the inner end of a rotatable shaft 121. This shaft 121 is rotatably held in a bracket 122 so that the shaft is free to rotate. The shaft 121 extends beyond the frame 22 of the apparatus and is provided with an accessible handle 123 for rotating the shaft 121. This rotation of the shaft also rotates the plate 120 which is attached thereto and because of the engagement of the shaft 120 with the fingers 119 moves the nut 117 along its rod 115. Because the fingers 119 in the nut 117 are extensive, the nut can move a considerable distance along its rod 15 without disengaging the fingers from the plate 120.

In normal operation the shaft 121 rotates but does not move longitudinally. This is provided by the relatively weak spring 124 around the shaft 121. Then, when it is desired to disengage the plate 120 from the fingers 119 it is only necessary to hold the shaft 121 outwardly by pulling on the handle 123 against pressure of the weak spring 124.

In order to oscillate the lever 96 about its bottom end or second point 99, there is provided a drive rod 125 having its free end rotatably attached to the second cam 33. The rear end 126 of this drive rod is positioned between the two metal strips 97 of the lever 96 at about the midpoint thereof and is hingedly attached thereto about a bolt 127 (FIGURE 10). The intermediate portion of the drive rod 125 is provided with an opening 128 of considerable vertical and lateral extent because the shaft 67 extends through this opening. The rotation of the second cam 33 by the gear reducer shaft 32 causes the back and forth driving movement of the drive rod 125. This reciprocates the lever 96 and thereby reciprocates the feeding means including the pin plate 84 and the feeding members attached thereto. As mentioned earlier, this back and forth reciprocation provides two of the four movements in the four motion cycle of movement of the feeding means.

In order to provide positive raising of the pin plate 84 and associated parts to supply another component of the four motion cycle, the second cam 33 which has a surface 129 extending approximately 180° engages the bottom surface 130 of a cam follower 131. This cam follower is hinged at one end about a pin 132 on the framework 22. The cam follower is urged in an upward direction by a spring 133 attached to a bracket 134 on the frame.

The cam follower 131 has attached thereto a rearwardly extending lever 135. This lever bears against a lower end of a vertical rod 136 held for vertical reciprocation in a bushing 137. The upper end of this rod 136 bears against the bottom of the pin plate 84 between the side flanges 91. FIGURES 8 and 9 illustrate the cam follower 131, lever 135 and rod 136 in raised position wtih the pins 81 extending into the bottom of the hopper and into the passage 45. Then, when the second cam 33 has turned further in the direction indicated by the arrow 138 (FIGURE 9), the parts are dropped by gravity as well as forced down by rearward motion of the slanted pins sliding in their holes, to the lower position as shown in FIGURES 2 and 6. The lifting cam 33 is not absolutely necessary to lifting of plate 84 as the pins 81 engaging bottom plate 36 will raise the pin plate 84 on forward motion thereof.

When in this lowered position the sides of the pin plate 84 rest on substantially parallel spaced shock absorbing strips 139 made of a resilient material such as sponge rubber. The top surface of the pin plate 84 is provided with a second set of bumpers 140 in the form of small metal pads which serve to keep the pin plate 84 separated from the bottom of the bottom plate 36 to prevent vacuum binding therebetween. This is important, particularly with plastic material such as ground meat which contains adhesive juices. These juices could cause vacuum binding of these two plates together and resulting malfunctioning of the machine because the dropping of the pin plate 84 and associated feeder elements connected thereto to the retracted position hsown in FIGURE 6, for example, is by gravity only when upward pressure of the rod 136 is released.

The spacing between the first and second stop members 106 and 107 may be varied by means of a handle 141 connected to a threaded rotatable bar 142 that is threaded to an end block 143 (FIGURE 9) which serves as a spacer between the parallel bearing strips 103 and 104. The second stop member 107 is mounted on the end of this bar 142 that is opposite the handle 141.

FIGURES 1 and 5 illustrate the two approximate extremes of spacing of the stop members 106 and 107 with the arrangement of FIGURE 1 being adapted for the molding of large quantities of material with each cycle of strokes and the spacing of FIGURE 5 molding small quantities of material, both in a manner to be described in greater detail hereinafter. The mold plate 47 is reciprocated between the two extreme positions of FIGURE 1 and FIGURE 2 in the manner previously described. When the mold plate is in the extended position of FIGURE 2 a knockout ring 158 is activated to enter the mold opening 46 and dislodge the molded article or patty 145 therefrom.

As stated earlier, the knockout cam 30 which is provided with the peripheral notch 31 is used to operate the knockout mechanism. This mechanism comprises a bar 146 hinged at one end to a frame member 147 and extending toward the front of the apparatus. This bar 146 carries a cam follower 148 adjacent the hinge 149 of the bar 146. The cam follower 148 rides on the periphery of the cam 30, as shown for example in FIGURE 1. The sliding hinge 149 mounting includes a horizontal transverse mounting bar 150 which is in turn fixedly held by the frame member 147 and a left part of the frame 22, as shown in FIGURE 11.

The bar 146 is continually urged downwardly by a spring 152 attached to the end of the bar 146 opposite the sliding hinge 149 with the other end of the spring 152 being attached to a bracket 153 on the frame of the apparatus.

The end of the bar 146 opposite the hinge 149 is rotatably attached, as indicated at 154 in FIGURE 11, to the bottom of a vertical rod 155 slidably held in a bushing 156. This bushing is mounted on the frame of the apparatus. The top of the rod 155 extends beyond the bushing 156 and carries on its upper end an arm 157 which extends over the mold plate 47 and which itself carries the knockout ring 158. This ring is positioned over the mold opening 46 when the mold plate 47 is in its extended position as shown in FIGURE 2. In this position the cam follower 148 has dropped into the notch 31 to permit the spring 152 to give a sharp downward pull to the knockout apparatus 146, 155, 157 and 158. Further rotation of the cam 30, as illustrated in FIGURE 2, raises the knockout apparatus so as to lift the ring 158 from the mold opening. In FIGURE 2 this lifting has just begun and lifting will be complete when the cam follower 148 is on the arcuate periphery of the cam 30, as illustrated in FIGURE 1.

In order to reduce noise of operation, there is provided a resilient bumper 159 of rubber or the like beneath the knockout rod 155.

As is shown in FIGURES 1 and 2, the successive patties 145 which are formed in the mold opening and then removed therefrom by the knockout mechanism are separated by a paper separator sheet 160. In the illustrated embodiment, these patties are accumulated in stacks on a movable support such as the endless belt 161 traveling over spaced pulleys 162 of which only one is shown. The belt and pulley structure is not illustrated further, as it forms no part of the present invention.

The apparatus for applying the separator sheets 160 to the patties 145 is located at the front of the machine. This separator sheet applying apparatus 163 is generally similar to the apparatus described and claimed in Richards et al. Patent 3,126,683, assigned to the same assignee as the present application. However, the apparatus 163 of the present application includes certain specific structure not shown in the Richards et al. patent.

Figure 15:
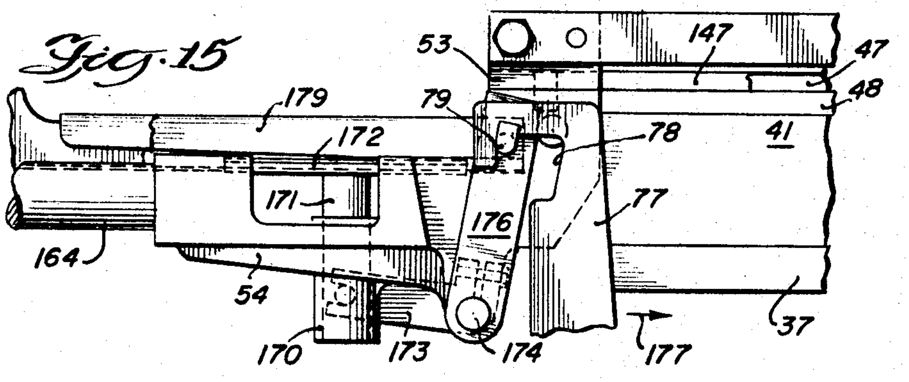
FIGURE 15 is a fragmentary side elevational view of the right-hand side of FIGURE 14.
Figure 16:
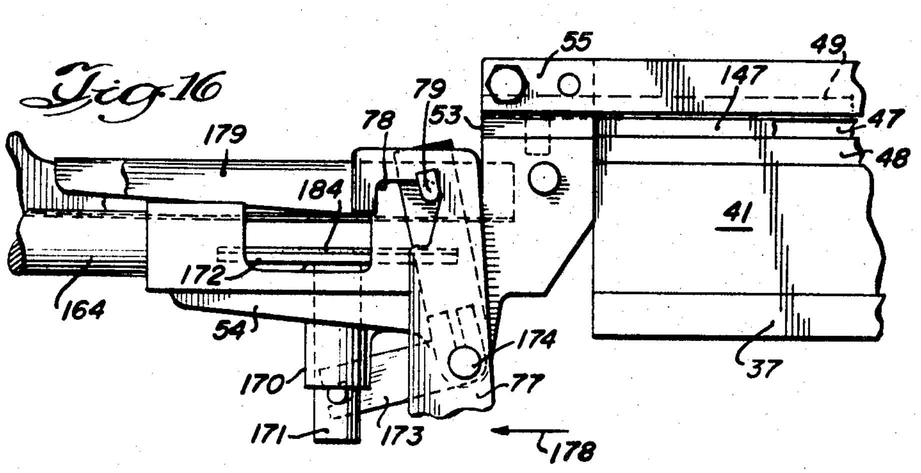
FIGURE 16 is a view similar to FIGURE 15 but showing the position of the parts at the beginning of the return travel of the paper carriage toward the front of the apparatus which in the illustrated embodiment is the left-hand end of FIGURES 1 and 2.

As is shown in plan view in FIGURE 4 and in sectional and side elevational views in FIGURES 14, 15 and 16, the paper feed includes the above-mentioned transfer carriage 54 that is reciprocated with the mold plate 47 on forwardly extending parallel rods 164. These rods extend forwardly beyond the block 41 which as previously mentioned contains the access passage from the hopper 34. The side drive bars 75 which reciprocate the mold plate 47 back and fourth also reciprocate the carriage 54 in the manner previously described. Also as previously described, the upper extensions 77 of the drive bars 75 have lost motion hooks 78 which permit the mold plate 47 to pause at each end of its path of travel with the pause at the end adjacent the hopper 34 providing sufficient time to fill the mold opening 46 while the pause at its forward end of travel provides time for the knockout ring 158 to enter the mold opening to remove the patty 145 and then to be withdrawn from the opening prior to retracting of the mold plate.

The paper carriage 54 travels between a forward paper holder 165 that is mounted on the forward ends of the parallel rods 164 and a paper supporting frame 166. The paper holder 165 includes paper confining sides 167, 190 and 191 for retaining a stack of individual sheets of separator paper, as indicated at 168. Each sheet of paper is perforated at one edge which when in the apparatus is the front edge of the paper, so that the stack 168 can be held by an upwardly extending pin 169. This pin is inclined rearwardly near its bottom so that the bottom sheets of paper in a stack 168 will be held in proper position for transfer to the paper retaining frame 166.

Figures 17, 18:
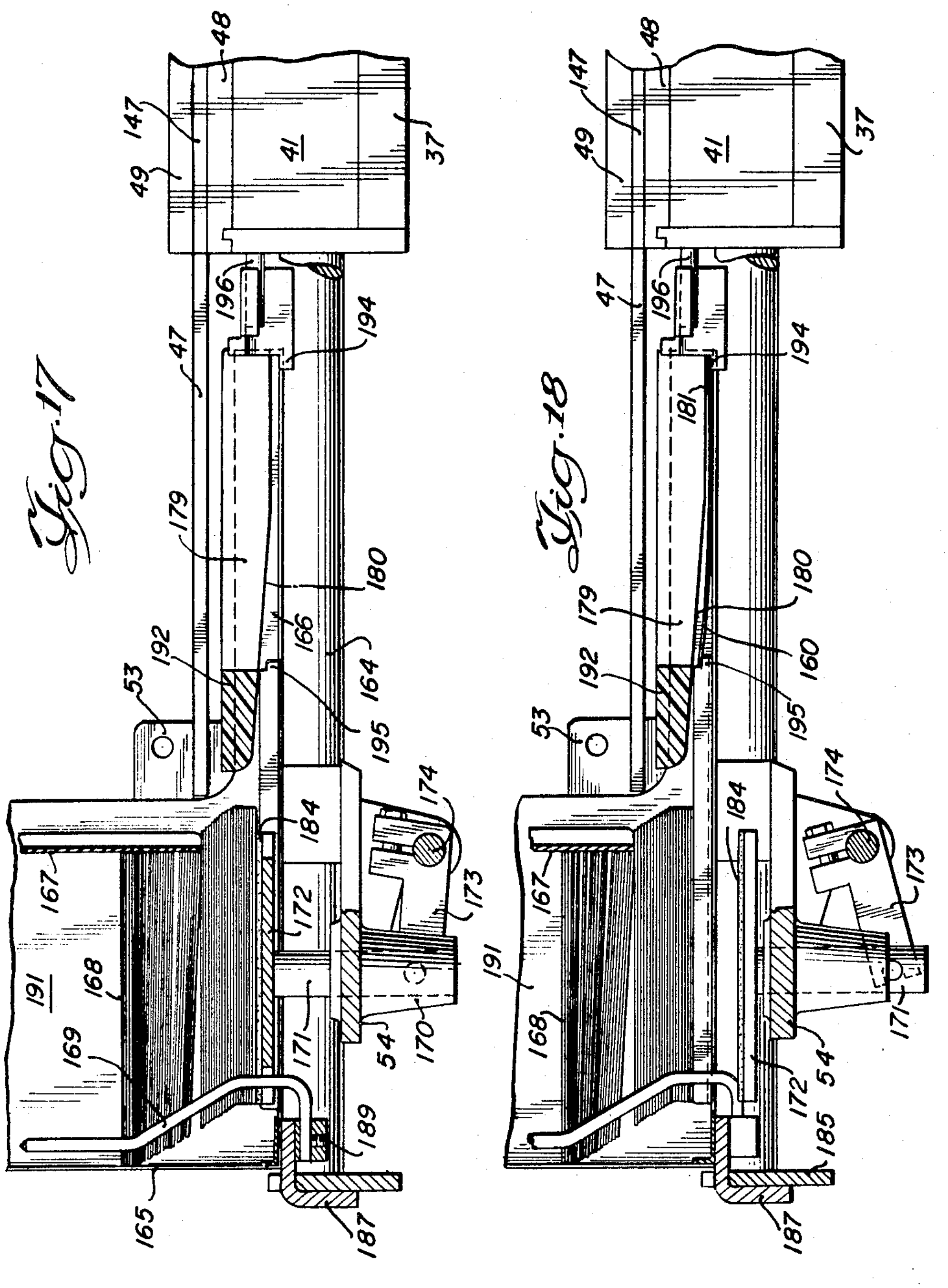
FIGURE 17 is an enlarged fragmentary side elevational view partially in section and partially broken away of the front of the apparatus with the parts in the second position of the return stroke.
FIGURE 18 is a view similar to FIGURE 17 but with the parts in the position illustrated at the left-hand side of FIGURE 2.

The lower sheets of paper are urged rearwardly (to the right as viewed in FIGURES 17 and 18) as they move down the inclined pin 169 and the sheets are moved one at a time from the bottom of the stack. Thus, the leading edges of these lower sheets are beneath the bottom edge of retaining wall 167 as shown in FIGURES 17 and 18. This arrangement is provided so that when the carrier platform 172 is raised to the position shown in FIGURE 17 from the position shown in FIGURE 18 the entire stack 168 is raised with the result that these leading edges are squeezed between the platform 172 and the bottom edge of wall 167. This provides a firm friction grip by the platform 172 on the lowermost sheet to pull it away from the retaining pin 169 on rearward motion of the platform.

Figures 19, 20:
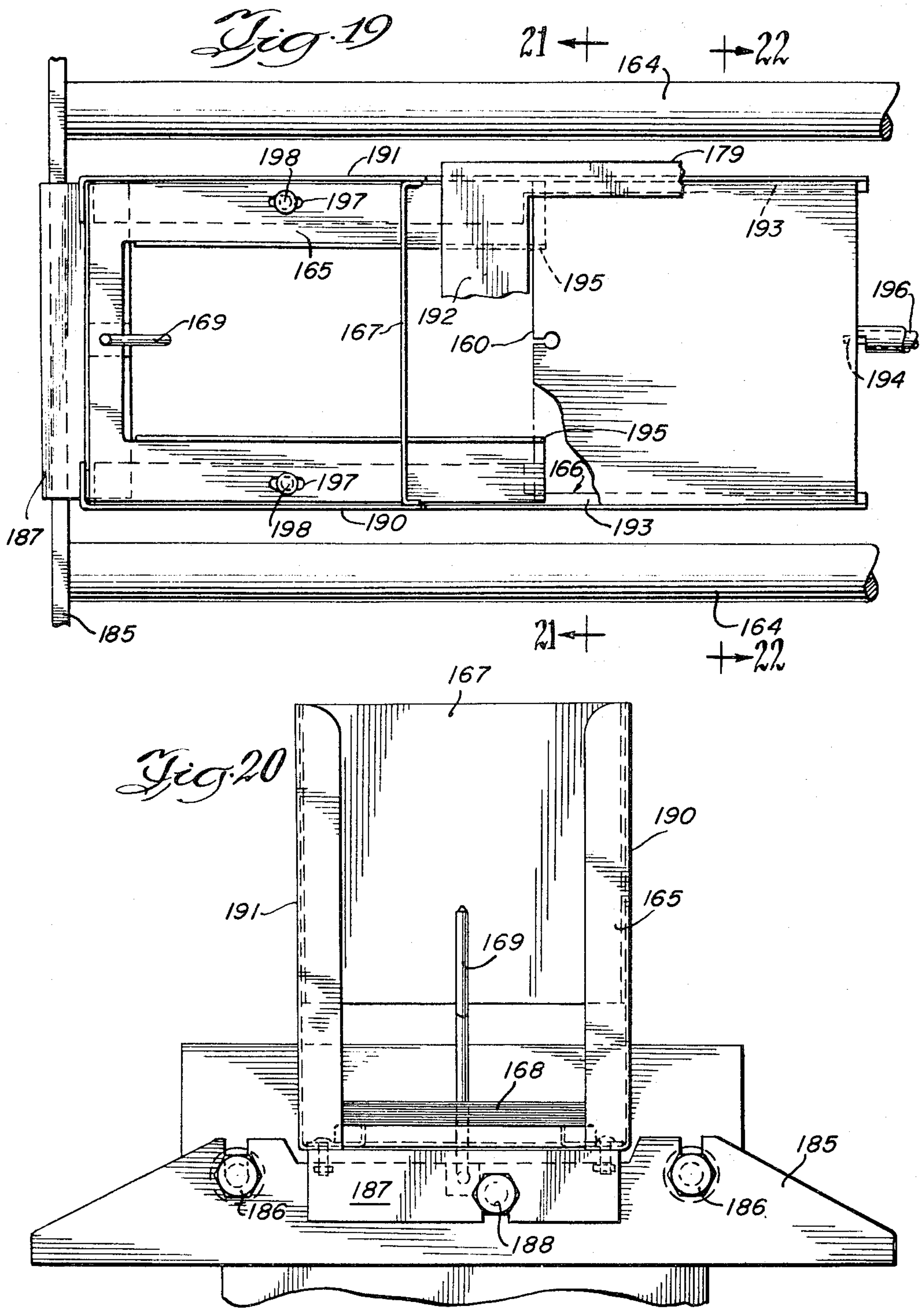
FIGURE 19 is a plan view of the paper holder end of the machine omitting the stack of paper but showing a single sheet in its supporting frame.
FIGURE 20 is a rear elevational view the paper holder of the apparatus.
Figure 22:
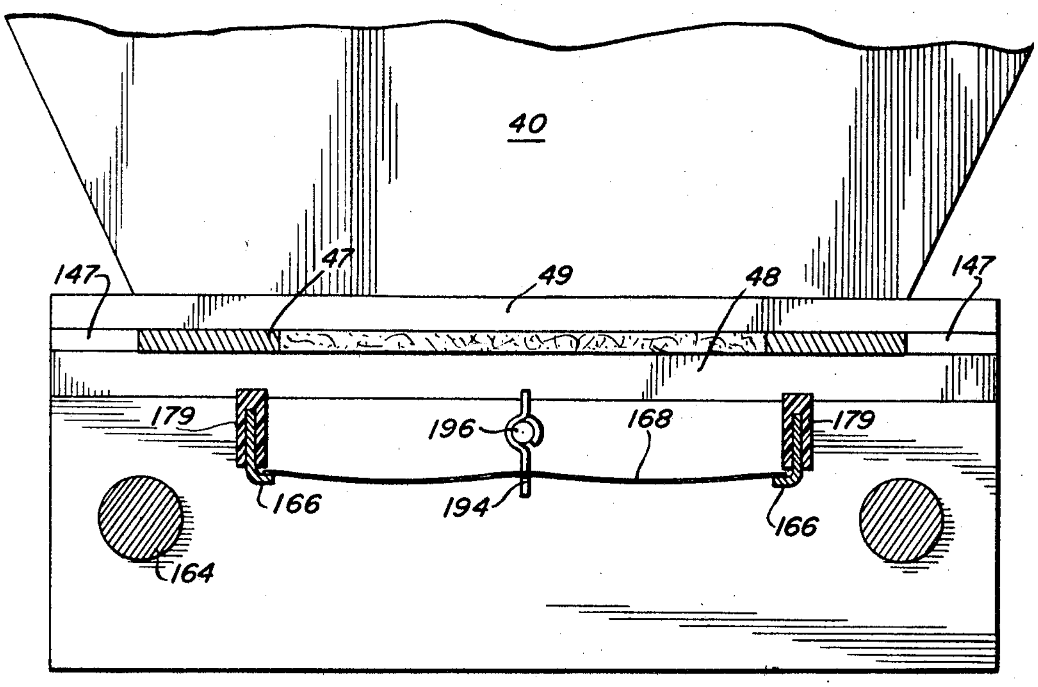
FIGURE 22 is a vertical sectional view along line 22—22 of FIGURE 19.

As the platform continues this rearward movement it moves the lowermost sheet from the pin 169 toward and into the retaining frame 166 (FIGURES 14, 19 and 22). During this movement the paper sheet 160 is passed beneath and in contact with a paper retaining cross bar 192. This bar is of metal, plastic or the like and has a lower coefficient of friction than the platform so that the sheet is frictionally held on and moved with the platform and "wiped" beneath the bottom surface of the bar 192. The bar 192 presses the sheet into this friction engagement with the platform.

The cross bar 192 overlying the sheet during its movement into the frame 166 has the additional function of preventing the sheet from accidentally being dislodged from the platform as the bar holds the sheet positively against the platform. Such dislodgement sometimes occurs if the bar is not used, particularly where the paper is imperfect in size or flatness or if the paper is extremely thin. In addition, it has been found that air currents and static electricity can dislodge the sheet where the hold down bar is not employed. Thus, with the bar the lowermost sheet is positively held at all times and securely carried by the platform from the pin to the frame 166 before being released.

As illustrated most clearly in FIGURES 14–18, the paper carriage 54 which slides back and forth on the parallel rods 164 carries on its bottom a depending bearing 170 in which is vertically slidable a shaft 171 which carries on its upper end a ppaer transporting platform 172.

The lower end of the shaft 171 is attached by a slotted pivot to a forwardly extending lever 173 which is itself attached to a transverse axle 174. Each end of the axle 174 is journaled in a bearing 175 on the carriage 54 and attached to each end of the axle 174 beyond the bearing 175 is an upwardly extending arm 176. The upper end of each arm carries the outwardly projecting pin 79 which as previously mentioned is engaged by the hook 78 on the upper leg extension of the drive bar 75. With this arrangement the driving force on the mold plate 47 is exerted through the bell crank combination of the rearwardly extending lever 173 and the upwardly extending arms 176 on each side. This means that when the drive bars 75–77 on the sides of the apparatus are pulled rearwardly, as indicated by the arrow 177 in FIGURE 15, the vertically movable shaft 171 and platform 172 are raised. Then, when the mold plate 47 and attached carriage 54 are moved forwardly, as indicated by the arrow 178 on FIGURE 16, the shaft 171 and paper supporting platform 172 are lowered.

Figure 21:
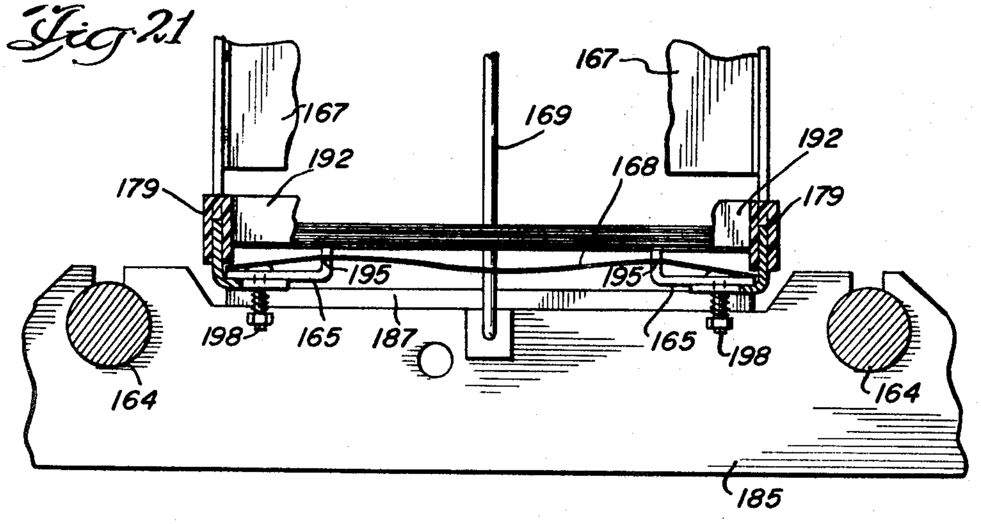
FIGURE 21 is a vertical sectional view along line 21—21 of FIGURE 19.

As shown most clearly in FIGURES 14, 18 and 21, the paper supporting frame 166 has spaced sides with the paper 160 adapted to be arranged therebetween. The supporting frame 166 which supports the single sheet of paper in position to be picked up by a descending molded article or patty consists of side supports 193, rear support 194 and front supports 195. The rear support 194 is adjustably movable on pin 196 (FIGURE 18) while the front supports 195 being part of paper holder 165 are adjustably movable with the holder 165 by reason of the elongated side slots 197 which are engaged by spring loaded bolts 198 (FIGURE 19). This adjustability permits perfect alignment for centering the sheets with respect to the successively formed molded articles, here the patties.

In order to guide the individual sheets 160 into proper engagement with the sides of the frame 166, there are provided side paper guides 179, shown most clearly in FIGURES 17 and 18. Each side guide 179 is integral with paper retaining cross bar 192 and has a rearwardly and downwardly sloped lower edge 180 which is engaged by the sides of the paper 160 to help guide these sides onto the frame 166. Furthermore, the leading edge 181 (FIGURE 18) of each paper sheet is directed by the guides 179 onto the rear edge support 194. Thus, with the paper support of this invention the paper is supported at the sides by the frame 166, at its leading edge by the support 194 and at its trailing edge by supports 195.

In order to aid in transferring sheets of paper in series from the bottom of the stack 168 the top of the paper platform 172 is provided with a high friction layer 184 of roughened rubber or the like.

With this arrangement, when the paper feed carriage 54 is moved forwardly to the position shown in FIGURE 18 by the drive bars, as previously described, the paper platform 172 is at lowered position when it reaches the extreme limit of its travel in this direction where it is beneath the stack 168 of paper. Then, as the platform is pulled rearwardly or toward the apparatus, as indicated by the arrow 177 of FIGURE 15, the pulling on the bell crank arm 176 raises the platform 172 to engage the bottom sheet on the stack 168 (FIGURE 17). Further movement of the carriage 54 and thus the platform 172 rearwardly or to the right as shown in FIGURE 17 causes the platform and its adhesive surface to pull the lowermost sheet from the pin 169. Further movement of the platform 172 in this direction causes the cross bar 192 and the side guides 179 to press the paper onto the support frame 166. This four motion action positively places the paper downwardly into the frame 166. Then, when the patty is removed from the mold opening at the position shown in FIGURE 2 by the lowering of the knockout structure, as previously described, the dislodged patty falls freely between the sides of the paper support frame 166 to pick up the paper, as shown by the paper 160, between each pair of stacked patties 145 in FIGURES 1 and 2.

The forward ends of the rods 164 on which the paper carriage travels are connected by a cross member 185 bolted thereto by the bolts 186 (FIGURE 20). The paper holder 165 is releasably supported on this cross member 185 by a bottom flange 187 on the bottom of the holder 165 being releasably retained by a forward bolt 188 on the member 185. This arrangement for mounting the paper holder is shown most clearly in FIGURES 18–20, inclusive. As is shown most clearly in FIGURE 17, the bottom of the paper retaining pin 169 is releasably secured as by a set screw 189 to a forward projecting portion of the flange 187.

The operation of the apparatus is as follows: When the parts are in the position shown in FIGURE 1, for example, the mold plate 47 has its mold opening 46 over the filling slot 52 as shown in FIGURE 8. Furthermore, the pin plate 84 is in raised position, having been elevated by its cam 33 and cam follower 130. At the same time, the pin plate 84 and bar 85 are in their forwardmost position so that plastic material such as ground meat has been forced into the mold opening 46, as shown in FIGURE 8, to form a patty 145.

When the mold plate is moved from the position of FIGURE 1, which is one extreme end of its reciprocation, to the position of FIGURE 2, or the other extreme end, with the mold opening exposed to the knockout ring 158, the pin plate 84 and the pins 81 and feeder bar 85 carried thereby is lowered to the position shown in FIGURE 6. The pin plate 84 is thereupon moved to the rear and then raised to the position shown in FIGURE 7 preparatory to its movement forward to the position shown in FIGURE 8 to force plastic material again through the slot 52 into the mold opening 46. Thus the feeding means embodied in the pin plate 84 and associated structure is moved through a four motion cycle, one motion is down from the position shown in FIGURE 8, the second is rearwardly, the third is upwardly to the position shown in FIGURE 7 and the fourth is forwardly to the position of FIGURE 8.

During this four motion cycle the mold plate 47 is reciprocated to the position shown in FIGURE 8 to receive the plastic material in the opening 46 and form the patty and then makes the round trip out to the position shown in FIGURE 2 for removal of the patty by the knockout ring in the manner previously described. At this point, one-half of the four motion cycle has been completed with the pin plate 84 in lowered and retracted position. Then, as the mold plate 47 is moved back toward the mold opening, pin plate 84 and its feeder bar 85 is moved upwardly and forwardly so that the returning mold opening 46 receives a new charge of plastic material to form the patty.

As is previously described, the raising and lowering of the pin plate 84 with its feeding elements is brought about by the cam 33 operating on the cam follower 130. This raising and lowering constitutes two of the four movements. The forward and backward reciprocation of the pin plate 84 and its feeder elements is caused by the backward and forward movement of the drive rod 125, the forward end of which is drivingly connected to the cam 33 and the rear end of which is drivingly connected to the upwardly extending lever 96.

The backward and forward reciprocation of the drive rod 125 causes oscillating movement of the lever 96 about its lower end, identified as the second point 99, resulting in backward and forward motion of the pin plate 84 or the other two motions of the four motion cycle.

The extent of back and forth reciprocation of the pin plate 84 is governed in a novel manner. This is done by providing the first and second stop members 106 and 107. The first stop member 106 functions as a fulcrum for forward movement of the pin plate 84 when the slide block 102 is pulled by the rod 125 into engagement therewith. The second stop member 107 operates as a fulcrum for rearward movement of the pin plate 84 in retracting the pin plate preparatory to another forward feeding movement.

As is customary in molding apparatus of this type, the mold plate 47 can be freely changed so as to provide a plate with the desired size opening 46. Where meat patties, for example, are being molded, these patties may vary in size from say two ounces to as much as sixteen ounces or more by providing the proper mold plate 47 with the desired size opening. Obviously, with the larger openings larger amounts of ground meat, for example, must be forced on each cycle of operation from the apparatus into the mold plate. This amount is easily controlled by varying the relative positions of the first and second stop members 106 and 107. Where the stop members 106 and 107 are relatively wide apart, as shown in FIGURE 5, the amount of material fed into the mold opening is correspondingly small. When the stop members are close together, as shown in FIGURES 1 and 2, the range of movement of the upper end 98 is greater. This range of movement of the upper end of the lever 96 governs the extent of forward and backward movement of the pin plate 84 and the feeder members 81 and 85 thereon. Obviously, the greater the extent of movement of these elements the more plastic material will be forced from the passage 45 into the mold opening.

When the stop members 106 and 107 are relatively far apart as shown in FIGURE 5, the feeder elements 81 and 85 will be drawn rearwardly only a small distance from the feeder slot 52 in the mold opening 46. Then, when the lever 96 is pulled forwardly by the rod 125, the pin plate 84 will not begin to move until the slide block 102 engages the first stop member 106. Then the pin plate 84 and feeder elements will be moved toward the mold opening to force material into the mold opening. The adjustable distance between the stops 106 and 107, therefore, provides a simple but effective way of governing the length of stroke of the feeder elements on the pin plate 84 and thus the amount of material forced into the mold opening of the appropriate capacity.

The rows of pins 81 that are inclined upwardly and toward the front of the apparatus provide a gentle urging of the plastic material such as the meat 80 toward and into the passage 45. Because these elements are in the form of pins this urging is accomplished without excessive working of the plastic material which in the case of meat and other edible materials would cause a degrading effect. The final mold filling pressure which is of considerable extent is thereby limited to the final push given by the feeder bar 85.

Because adhesive materials such as meat and other food products tend to stick to the sides of the hopper 34 and also tend to arch over, the side scrapers 61 are provided operatively connected to the mold plate 47 so that each reciprocation of the mold plate causes the scrapers 61 to loosen and dislodge plastic material from the hopper. With this arrangement, hoppers of extremely large sizes can now be used even for such adhesive materials as ground meat without requiring an attendant at the hopper to continually push the material down to be fed into the mold.

During forward feeding movement of the pin plate 84 and attached feeder bar 85 excessive pressure on the plastic material is avoided by the use of the spring 118. As the lever 96 is pulled forwardly by the drive rod 125 it applies pressure to the plastic material by way of the feeder bar 85 only up to a preselected maximum. This maximum is dependent on the amount of force required to compress the spring 118. When this force is exceeded, the excess force is not applied to the plastic material but causes the spring 118 to yield. This avoids excessive working of the material which in the case of meat is of extreme importance to prevent degrading of the meat.

As can be seen from the above description, the molding apparatus of this invention provides a high capacity, easily adjustable apparatus for molding articles of various sizes. The apparatus is particularly applicable for molding hamburger or other edible product patties and can be readily adapted to produce patties of any desired size and weight. A practical limit has been found to be from two ounces to sixteen ounces. Obviously, with the large size patties and with the apparatus operating at the high speed that is usually employed, a vast amount of material must be provided. The improved hopper and feeding apparatus of this invention permits providing these large quantities of material without requiring constant attention.

The apparatus of this invention as described above with relation to the illustrated embodiment provides a readily available supply of plastic material in the hopper 34 which is gently urged without excessive working by the feeder pins 81 into the passage 45. In the passage 45 the plastic material is forced under strong pressure by the feeder bar 85 through the passage 52 into the mold opening 46. This feeder means is self-compensating to supply the required amount of plastic material to the feeder bar 85. This means that the supply of plastic material required by the feeder bar 85 is always provided in the necessary amounts by the feeder pins 81. For example, if the range of feeding movement of the bar 85 is small, as determined by the yielding of the resilient spring 118, the movement of feeder pins 81 will be correspondingly small. This means that whatever the requirements of the feeder bar 85 the pins 81 will always supply these requirements.

It will often happen when molding material such as ground meat that varying densities will be encountered in the ground meat from one feeding movement of the bar 85 to the next. This is due to the differences in consistency of the plastic material, differences in amounts of entrapped air and the like. The apparatus of this invention will automatically compensate for this. Thus, when the material being fed into the mold opening is of relatively low density the feeder bar 85 will travel further as defined by the preset tension of the spring 118 than it will when the material is of greater density. This means that with each "bite" of the bar 85 more material is moved. Because the feeder pins 81 move with the bar 85 this means that more material is provided to the feeder bar 85 by the pins 81 when these greater amounts are required. Conversely, when the material even from one bite to the next is of increased density the bar 85 will travel a shorter distance before being stopped by the precompressed spring 118 which means that less material is required on each feeding movement. Automatically, under these conditions, the pins 81 (which move in unison with the bar 85) will move this lesser amount of material from the hopper 34 to the region of the bar 85.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. In an article shaping device in which an article is shaped, apparatus for applying a flexible sheet having a plurality of peripheral edges to the shaped article, comprising: means for propelling said article in a path through space; means including a frame defining an opening in said path through which said article passes in said propelling, said frame having retaining means for engaging all said edges to retain said sheet in said frame to span said opening, some of said retaining means being located opposite each other and spaced a shorter distance apart than the corresponding dimension of said flexible sheet to retain said sheet in bowed condition; and means for moving a sheet into said frame in said bowed condition.

2. In an article shaping device in which an article is shaped, apparatus for applying a flexible sheet having a plurality of peripheral edges to the shaped article, comprising: means for propelling said article in a path; means including a frame defining an opening in said path through which said article passes, said frame having retaining means for engaging said edges to retain said sheet in said frame to span said opening; stack means for holding a stack of said sheets exteriorly of said frame; carrier means movable between said retaining means and said frame for moving a sheet into said frame; and means for pressing said sheet on said carrier means during substantially the entire carriage movement between said stack means and frame retaining means.

3. In an article shaping device in which an article is shaped, apparatus for applying a flexible sheet having a plurality of peripheral edges to the shaped article, comprising: means for propelling said article in a path; means including a frame defining an opening in said path through which said article passes, said frame having retaining means for engaging said edges to retain said sheet in said frame to span said opening; stack means for holding a stack of said sheets exteriorly of said frame and having an open bottom; a movable carrier having sheet engaging means thereon; means for mounting said carrier for movement between a first position beneath said stack means bottom and a second position adjacent said frame opening and back again; means for mounting said carrier for movement upwardly from said first position to engage a bottom sheet on said stack with said sheet engaging means preparatory to movement of said carrier and said sheet to said second position, and for movement downwardly at said second position to leave said sheet in said frame retaining means; and means for moving said carrier upwardly at said first position to thusly engage said bottom sheet, then to said second position for engaging said side edges in said frame retaining means, then downwardly to leave said sheet in said frame, and next back to said first position.

4. The apparatus of claim 3 wherein side guides are provided at the lateral sides of said frame to guide the sheet on said carrier into said frame.

5. The apparatus of claim 4 wherein each said side guide is provided with a rearwardly and downwardly sloped portion to guide said sheet into said frame.

6. The apparatus of claim 3 wherein a paper retaining cross bar means is provided forwardly of said frame to press said sheet on said carrier in passing from said retaining means to said frame.

7. The apparatus of claim 3 wherein side guide means are provided at the lateral sides of said frame to guide the sheet on said carrier into said frame, each said side guide is provided with a rearwardly and downwardly sloped portion to guide said sheet into said frame and a paper retaining cross bar means is provided forwardly of said frame to press said sheet on said carrier in passing from said retaining means to said frame.

References Cited

UNITED STATES PATENTS 2,959,900 11/1960 Wollett ---------- 53—122 XR

WILLIAM W. DYER, Jr., *Primary Examiner.*

R. ALVEY, *Assistant Examiner.*